United States Patent
Prager et al.

(10) Patent No.: US 8,755,395 B2
(45) Date of Patent: Jun. 17, 2014

(54) WIRELESS COMMUNICATION SUBSYSTEM WITH A DIGITAL INTERFACE

(75) Inventors: David Prager, Bothell, WA (US); Bruce C. Rothaar, Woodinville, WA (US); Heinz Lycklama A'nyeholt, Arlington, VA (US); Dave Randall, Kingston, WA (US)

(73) Assignee: NETGEAR, Inc, San Jose, CA (US)

( * ) Notice: Subject to any disclaimer, the term of this patent is extended or adjusted under 35 U.S.C. 154(b) by 10 days.

(21) Appl. No.: 12/830,815

(22) Filed: Jul. 6, 2010

(65) Prior Publication Data

US 2010/0272163 A1    Oct. 28, 2010

Related U.S. Application Data

(63) Continuation of application No. 10/010,935, filed on Dec. 5, 2001, now Pat. No. 7,773,614.

(51) Int. Cl.
*H04L 12/56* (2011.01)

(52) U.S. Cl.
USPC ............................ 370/402; 370/425; 370/503

(58) Field of Classification Search
USPC ......................................... 370/402, 425, 503
See application file for complete search history.

(56) References Cited

U.S. PATENT DOCUMENTS

| | | | |
|---|---|---|---|
| 5,301,303 A | 4/1994 | Abraham et al. | |
| 5,504,742 A | 4/1996 | Kakuma et al. | |
| 5,574,979 A | 11/1996 | West | |
| 5,742,640 A * | 4/1998 | Haoui et al. | 375/220 |
| 5,802,177 A * | 9/1998 | Daniel et al. | 380/270 |
| 5,819,177 A * | 10/1998 | Vucetic et al. | 455/425 |
| 5,889,821 A | 3/1999 | Arnstein et al. | |
| 5,946,624 A | 8/1999 | Petranovich et al. | |
| 5,952,966 A | 9/1999 | Smith | |
| 5,978,650 A | 11/1999 | Fischer et al. | |
| 6,006,071 A | 12/1999 | Roberts et al. | |
| 6,016,313 A | 1/2000 | Foster, Jr. et al. | |
| 6,272,129 B1 | 8/2001 | Dynarski et al. | |
| 6,275,990 B1 * | 8/2001 | Dapper et al. | 725/106 |
| 6,301,306 B1 | 10/2001 | McDonald et al. | |
| 6,346,692 B1 | 2/2002 | Ubowski et al. | |
| 6,374,082 B1 | 4/2002 | Carlson | |
| 6,463,096 B1 | 10/2002 | Raleigh et al. | |
| 6,463,261 B1 | 10/2002 | Hiramatsu et al. | |

(Continued)

OTHER PUBLICATIONS

U.S. Appl. No. 09/843,621, Prismantas.

(Continued)

*Primary Examiner* — Jason Mattis
(74) *Attorney, Agent, or Firm* — Fulbright & Jaworski LLP

(57) ABSTRACT

Systems and methods are disclosed which provide wireless communication systems implementing subsystems adapted for flexible deployment configurations and to resist the introduction of interference. Preferred embodiments of the present invention provide a wireless communication system configuration in which an ODU subsystem is coupled to an IDU subsystem using a fiber optic link. According to a preferred embodiment of the present invention, an ODU subsystem is adapted to provide conversion between digital and analog to thereby facilitate the use of a digital link between the ODU subsystem and a corresponding IDU subsystem. Embodiments of the present invention utilize a plurality of ODU subsystems configured according to the present invention to provide wireless communication coverage of a service area, such as to provide a wireless application termination system (WATS) hub for use in providing wireless communication links with respect to a plurality of subscriber units.

9 Claims, 2 Drawing Sheets

(56) References Cited

U.S. PATENT DOCUMENTS

| | | |
|---|---|---|
| 6,477,154 B1 | 11/2002 | Cheong et al. |
| 6,489,908 B2 | 12/2002 | Panasik et al. |
| 6,654,616 B1 | 11/2003 | Pope, Jr. et al. |
| 6,704,346 B1 | 3/2004 | Mansfield |
| 6,704,579 B2 | 3/2004 | Woodhead et al. |
| 6,711,380 B1 | 3/2004 | Callaway, Jr. |
| 6,865,170 B1* | 3/2005 | Zendle .......... 370/338 |
| 6,963,547 B1* | 11/2005 | Kwak et al. ........ 370/310.1 |
| 6,970,441 B1 | 11/2005 | Pirhonen et al. |
| 7,016,686 B2 | 3/2006 | Spaling et al. |
| 7,024,680 B2 | 4/2006 | Howard |
| 7,085,306 B1 | 8/2006 | Voldman et al. |
| 7,292,608 B1 | 11/2007 | Nowell et al. |
| 7,334,253 B2 | 2/2008 | Howard |
| 7,773,614 B1* | 8/2010 | Prager et al. ........... 370/402 |
| 2002/0001337 A1 | 1/2002 | Chauncey et al. |
| 2002/0051436 A1 | 5/2002 | Ertel et al. |
| 2002/0077113 A1 | 6/2002 | Spaling et al. |
| 2002/0126704 A1* | 9/2002 | Cam et al. ............ 370/503 |
| 2002/0155811 A1 | 10/2002 | Prismantas et al. |
| 2002/0173271 A1 | 11/2002 | Blair et al. |
| 2002/0174441 A1 | 11/2002 | Marin et al. |
| 2002/0196749 A1 | 12/2002 | Eyuboglu et al. |
| 2003/0008683 A1 | 1/2003 | Nanao et al. |
| 2003/0021251 A1 | 1/2003 | Moshiri-Tafreshi et al. |
| 2003/0043738 A1 | 3/2003 | Barsheshet |
| 2003/0087651 A1 | 5/2003 | Rauschmayer |
| 2003/0161386 A1 | 8/2003 | Schilling |
| 2004/0160917 A1 | 8/2004 | Eliznd et al. |
| 2004/0203714 A1 | 10/2004 | Van Lieshout et al. |
| 2006/0062152 A1* | 3/2006 | Shi et al. ............. 370/235 |
| 2006/0070094 A1 | 3/2006 | Sun et al. |

OTHER PUBLICATIONS

U.S. Appl. No. 09/851,408, Rothaar et al.
U.S. Appl. No. 10/010,935, Prager et al.

* cited by examiner

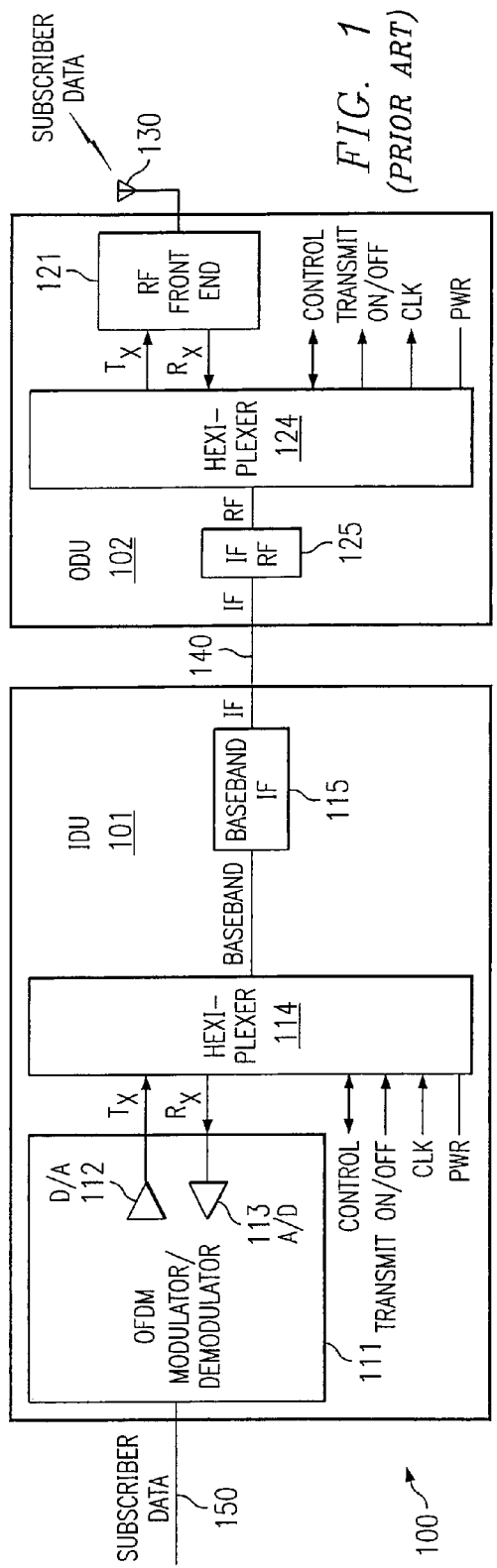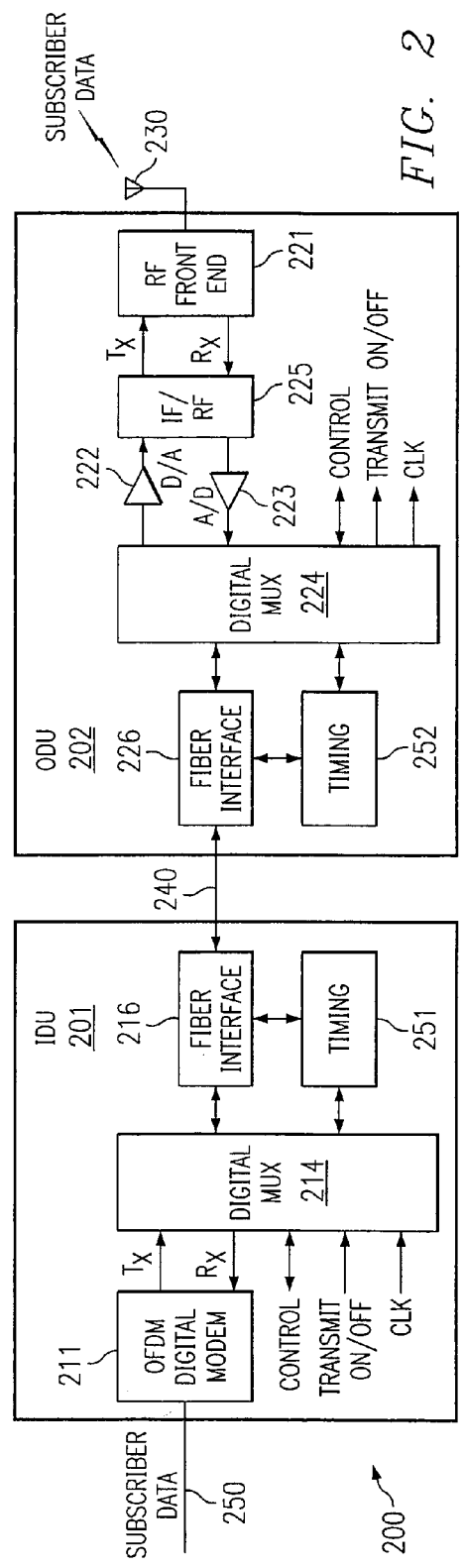

WIRELESS COMMUNICATION SUBSYSTEM WITH A DIGITAL INTERFACE

CROSS-REFERENCE TO RELATED APPLICATIONS

This Application is a Continuation of application Ser. No. 10/010,935 filed on Dec. 5, 2001. Application Ser. No. 10/010,935 is related to commonly assigned U.S. patent applications Ser. No. 09/843,621 entitled "System and Method for Mitigating Data Flow Control Problems in the Presence of Certain Interference Parameters," filed Apr. 26, 2001; Ser. No. 09/851,408 entitled "System and Method for Statistically Directing Automatic Gain Control," filed May 7, 2001; and Ser. No. 09/837,476 entitled "System and Method for Adapting RF Transmissions to Mitigate the Effects of Certain Interferences," filed Apr. 18, 2001, the disclosures of which are hereby incorporated herein by reference.

TECHNICAL FIELD

The invention relates generally to wireless communication systems and, more particularly, to configurations of wireless communication systems employing a digital interface between an outdoor unit and an indoor unit.

BACKGROUND OF THE INVENTION

Currently there is substantial demand for fixed wireless communication systems providing relatively high speed and/or high data capacity from location to location. For example, some Internet infrastructure providers and competitive local exchange carriers (CLEC) provide so-called "last mile" and "last foot" wireless transmission systems using radio frequency (RF) transmissions to bridge gaps in the available copper or coaxial wire and fiber optic cable.

Conventionally these RF transmission systems have operated in the microwave or millimeter wave frequencies, such as through the use of point-to-point or point-to-consecutive point systems operating in the 27-38 GHz bands. Additionally, Multichannel Multipoint Distribution System (MMDS) frequency bands at 2.1 to 2.7 GHz may be employed for data communications as well as bands known as the 3.5 GHz bands. More recently, frequencies in the 5 GHz band have been freed for use in high speed and/or high data capacity transmissions. Specifically, the United States Federal Communications Commission (FCC) created a wireless arena called the Unlicensed National Information Infrastructure (U-NII) setting forth three sub-bands (5.15 to 5.25 GHz, 5.25 to 5.35 GHz, and 5.725 to 5.825 GHz) available for wireless communication without acquiring a license. Systems and methods specifically adapted for use in such unlicensed bands are shown and described in the above referenced applications entitled "System and Method for Mitigating Data Flow Control Problems in the Presence of Certain Interference Parameters," "System and Method for Statistically Directing Automatic Gain Control," and "System and Method for Adapting RF Transmissions to Mitigate the Effects of Certain Interferences."

Beyond the licensing, availability, and interference issues associated with the particular spectrum utilized for such wireless communications, many challenges face those seeking to establish reliable and economic wireless communication infrastructure. For example, wireless communication systems often must be configured to allow the deployment of an antenna or antenna array at a suitable elevation and/or having a substantially clear line of sight, such as by positioning an outdoor unit (ODU) on a roof top or on a mast. Various electrical components coupled thereto may be deployed at some distance, such as deploying an indoor unit (IDU) within the confines of a building or associated radio shack. Often the separation of such components results in degraded communication quality, reliability, and/or configuration flexibility. For example, transmission lines coupling prior art ODUs and IDUs are often prone to the introduction of interference and/or attenuation of signals conducted therethrough. Additionally, the links employed according to the prior art, typically coaxial cables, present a single point of failure, such as may occur due to relatively minor physical damage, and are often quite bulky and resistant to turning tight radiuses, requiring large minimum radiuses and other deployment necessities. Moreover, the distance by which an ODU and corresponding IDU may be separated has typically been relatively limited according to the prior art.

In addition to the aforementioned challenges associated with deploying a configuration of a prior art ODU and IDU, challenges with respect to establishing reliable and economic wireless communication infrastructure often include the ability to provide suitable communication coverage of a service area. For example, prior art ODUs are typically relatively large devices, generally requiring appreciable space and structure for their deployment, and therefore are less than ideal for configurations in which a number of such systems are disposed to illuminate a relatively large service area, such as that associated with a point-to-multipoint base station or hub.

Accordingly, a need exists in the art for systems and methods which provide reliable and/or economic wireless communication infrastructure, such as through the use of systems configured to facilitate flexibility with respect to deployment and connecting of subsystems thereof. Moreover, a need exists in the art for such systems and methods to resist the introduction of interference and/or provide for fault tolerance.

BRIEF SUMMARY OF THE INVENTION

The present invention is directed to systems and methods which provide a wireless communication system implementing subsystems which are adapted for relatively flexible deployment configurations and which are adapted to resist the introduction of interference. Preferably these wireless communications systems generally employ frequencies in the range of 2 to 11 GHz. Included in this band are the sub-bands of the U-NII, MMDS, Wireless Communications Service (WCS) and 3.5 GHz bands. Preferred embodiments of the present invention provide a wireless communication system configuration in which an ODU subsystem is coupled to an IDU subsystem using a fiber optic link. Preferably, the use of such a fiber optic link according to the present invention allows flexibility in the configurations in which the ODU and IDU subsystems may be deployed, both in separation distance and in the physical attributes of the environment which may be acceptably accommodated.

According to a preferred embodiment of the present invention, an ODU subsystem is adapted to provide conversion between digital and analog to thereby facilitate the use of a digital link between the ODU subsystem and a corresponding IDU subsystem. Such an ODU subsystem configuration provides advantages in that the RF signals of the wireless communication link, which are generally susceptible to interference, are relatively quickly converted to a digital signal for further processing. Moreover, the multiplexing of such a digital signal with other signals which may be communicated between the ODU subsystem and IDU subsystem, such as control and/or timing signals or other overhead information, is simplified, allowing for an ODU subsystem physically smaller and simplified, at least with respect to particular aspects, as compared to typical prior art ODU configurations.

The preferred embodiment fiber optic link between the ODU subsystem and the IDU subsystem presents less bulk than that of conventional RF links, such as the aforementioned coaxial cable, which is of substantial size when provided in a low loss configuration. Further, such a link is substantially immune to the introduction of interference energy and allows for relatively long distances to be traversed between an ODU subsystem and an IDU subsystem of the present invention.

Embodiments of the present invention utilize a plurality of ODU subsystems configured according to the present invention to provide wireless communication coverage of a service area, such as to provide a wireless application termination system (WATS) hub for use in providing wireless communication links with respect to a plurality of wireless subscriber units. The relatively small ODU subsystems of a preferred embodiment are particularly well suited for such deployments. Moreover, the preferred embodiment fiber optic ODU subsystem/IDU subsystem interface of the present invention facilitates the use of one, or a relatively few, links between such subsystems even when deployed in a hub configuration.

A single fiber optic link may be relied upon to provide bandwidth sufficient to carry data associated with the wireless links of a plurality of ODU subsystems of the present invention. Accordingly, a preferred embodiment of the present invention includes a single fiber optic link between an IDU subsystem location and an ODU subsystem location. A plurality of ODU subsystems may be coupled to this link using signal splitting and/or switching technology. For example, according to an embodiment of the present invention, a plurality of ODU subsystems deployed on a common rooftop are coupled together, e.g., in daisy chain fashion, to share a single fiber optic link with a corresponding IDU subsystem or subsystems.

Preferred embodiments of the present invention provide fault tolerant configurations. For example, an embodiment of the present invention provides at least two fiber optic links between an IDU subsystem location and an ODU subsystem location. Accordingly, a fiber optic ring architecture, such as a resilient ring topology, may be deployed with respect to the IDU subsystem and ODU subsystem link of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows a typical prior art wireless communication system configuration for use in point-to-point communications;

FIG. 2 shows a preferred embodiment wireless communication system of the present invention.

DETAILED DESCRIPTION OF THE INVENTION

Figure 3:
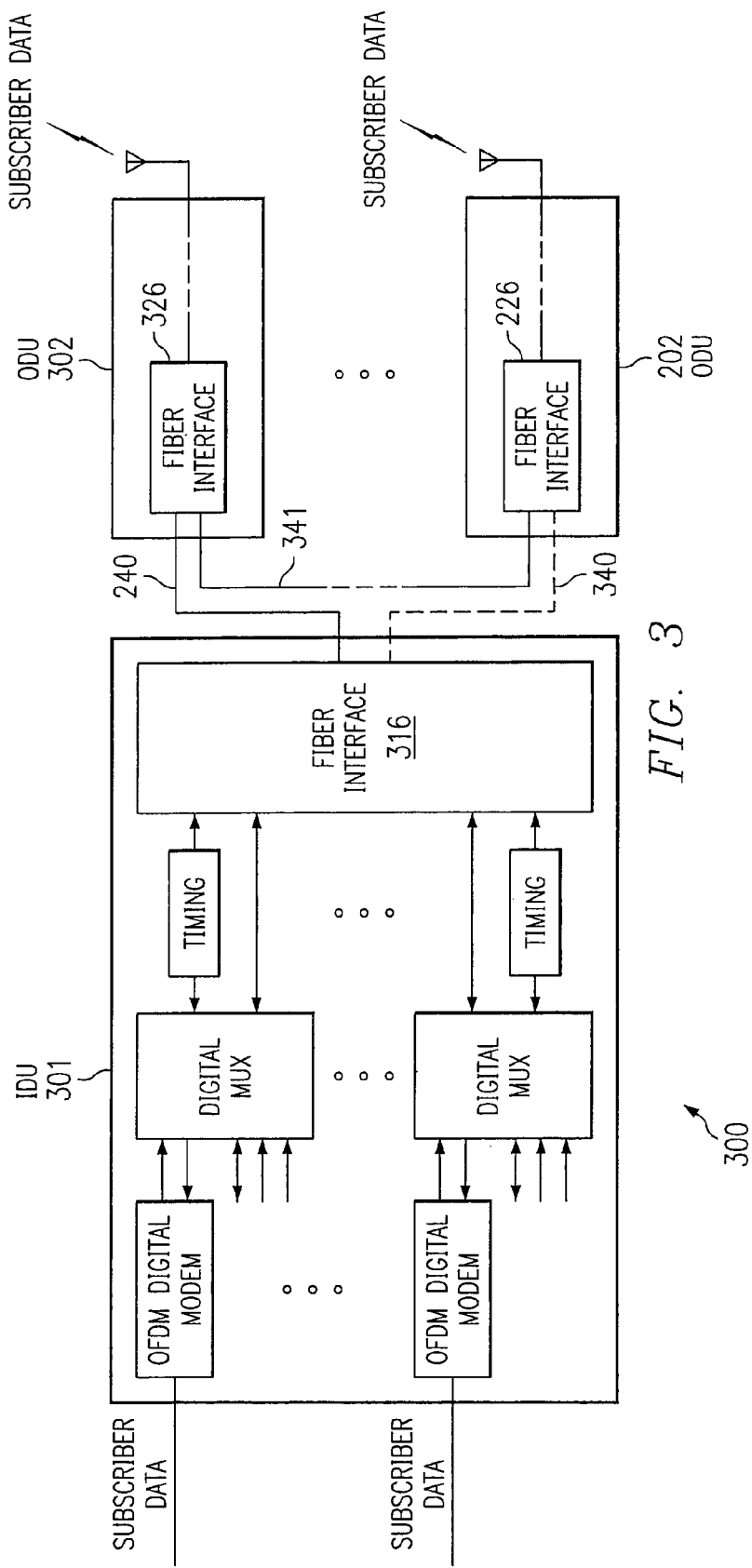
FIG. 3 shows an alternative embodiment wireless communication system of the present invention.

Directing attention to FIG. 1, a prior art wireless communication system employing a substantially conventional indoor unit (IDU) and outdoor unit (ODU) configuration is shown. Specifically, wireless communication system 100, such as may be utilized in providing one end of a broadband wireless communication link, includes IDU 101 and ODU 102. Subscriber data is provided to/from IDU 101 through subscriber data interface 150, such as may be coupled to a network or customer premise equipment. Correspondingly, subscriber data is provided to/from ODU 102 through RF antenna 130, such as may be in wireless communication with a similarly configured wireless communication system. IDU 101 and ODU 102 are provided an information communication link by coaxial cable 140.

The illustrated embodiment of prior art IDU 101 includes orthogonal frequency division multiplex (OFDM) modem 111 coupled to subscriber data interface 150 to accept/provide digital subscriber data communication thereto. OFDM modem 111 includes digital to analog and analog to digital circuitry, D/A 112 and A/D 113 respectively, to provide conversion of subscriber data between digital and analog formats, e.g., conversion between digital Internet protocol (IP) and an analog baseband frequency. OFDM modem 111 is coupled to hexiplexer 114 to provide multiplexing/demultiplexing of analog signals communicated between IDU 101 and ODU 102, such as by the use of relatively complicated frequency division multiplexing. Hexiplexer 114 is coupled to frequency converter 115 providing frequency conversion between the analog baseband frequency and an analog intermediate frequency. Frequency converter 115 is coupled to coaxial cable 140 providing communication of analog intermediate frequency signals between IDU 101 and ODU 102.

The illustrated embodiment of prior art ODU 102 includes frequency converter 125 providing frequency conversion between the analog intermediate frequency and an analog RF frequency. As with frequency converter 115 of IDU 101, frequency converter 125 of ODU 102 provides communication of analog intermediate frequency signals between ODU 102 and IDU 101. Frequency converter 125 is coupled to hexiplexer 124 to provide multiplexing/demultiplexing of analog signals communicated between ODU 102 and IDU 101, using frequency division multiplexing techniques. Hexiplexer 124 is coupled to RF front end 121. RF front end 121 is coupled to RF antenna 130 to transmit/receive analog subscriber data associated with wireless communication.

The above described substantially conventional wireless communication system configuration suffers from several disadvantages. For example, the coaxial cable link between the IDU and the ODU is relatively limited in the distances that may be traversed before unacceptable signal quality is experienced. Moreover, such coaxial cables are typically lossy and/or of considerable bulk. Such cables, therefore, present difficulties in their being routed in many situations, such as where relatively tight radius corners are required or where unobtrusive cable runs are desired. Additionally, such cables are typically relatively susceptible to damage resulting in degradation of signal transmission attributes. For example, due to the bulk of the cable it may be more prone to damage at various points along a cable run. Coaxial cable is particularly susceptible to performance degradation associated with seemingly minor damage to insulating layers. For example, an outer insulating layer may be punctured and, although not directly impinging upon the conductors contained therein, may allow infiltration of moisture changing dielectric properties of the coaxial cable and/or corroding the conductive material, resulting in performance degradation. Moreover, coax connectors used with such coaxial cable are susceptible to moisture infiltration and corrosion which not only results in signal degradation, but which may also result in equipment damage.

The transmission of analog signals, such as the aforementioned analog intermediate frequency between the IDU and ODU, is prone to signal degradation, such as associated with noise and interference energy. For example, the coaxial cable linking the IDU and ODU may be routed near sources of electromagnetic energy, such as electric motors or transformers, resulting in degradation of the signals transmitted therethrough. Similarly, the analog circuitry of the IDU and ODU may contribute to signal degradation if not properly shielded or otherwise isolated. Analog multiplexing circuits are generally subject to drift due to aging, temperature fluctuations and other environmental factors such as humidity. Additionally such analog multiplexing circuits function differently from unit-to-unit due to component manufacturing tolerances.

A further disadvantage of the substantially conventional configuration illustrated in FIG. 1 is that the ODU is typically relatively large and complicated, perhaps even employing a climate control system. For example, the illustrated hexiplexer circuitry employing frequency division multiplexing is difficult to implement and must typically be physically large in order to minimize signal attenuation and/or the introduction of noise.

The foregoing notwithstanding, it should be appreciated that the configuration shown in FIG. 1 provides certain advantages which have led to conventional implementations to adopt such a configuration. In the configuration of FIG. 1, hexiplexers 114 and 124 combine/separate DC power (PWR), subscriber data receive and transmit signals, clock signal, and blanking signal for communication via coaxial cable 140.

Directing attention to FIG. 2, a preferred embodiment configuration of a wireless communication system adapted according to the present invention is shown. Specifically, wireless communication system 200, such as may be utilized in providing one end of a broadband wireless communication link, e.g., a base station hub, includes IDU subsystem 201 and ODU subsystem 202. Subscriber data is provided to/from IDU subsystem 201 through subscriber data interface 250, such as may be coupled to any number of devices, including switches, routers, multiplexers, and/or customer premise equipment; or networks or other communication backbones, including the public switched telephone network (PSTN), the Internet, a local area network (LAN), metropolitan area network (MAN) or wide area network (WAN). Correspondingly, subscriber data is provided to/from ODU subsystem 202 through RF antenna 230, which may be in wireless communication with any number of devices, including a similarly configured wireless communication system, a subscriber system, or the like. Notably, in the configuration of FIG. 2, IDU subsystem 201 and ODU subsystem 202 are provided an information communication link by fiber optic cable 240.

According to a preferred embodiment configuration of FIG. 2, all analog signal processing associated with the wireless link provided by wireless communication system 200 is isolated within ODU subsystem 202. Accordingly, IDU subsystem 201 of the preferred embodiment provides only digital signal processing. Correspondingly, fiber optic cable 240 of the preferred embodiment provides a digital signal link between IDU subsystem 201 and ODU subsystem 202 of communication system 200.

Accordingly, the illustrated embodiment of IDU subsystem 201 includes OFDM digital modem 211, preferably including substantially only those circuit components of an OFDM modem utilized with respect to digital processing of signals. OFDM digital modem 211 is preferably coupled to subscriber data interface 250 to accept/provide digital subscriber data communication thereto. Subscriber data as provided to/from subscriber data interface 250 may be in any of a plurality of data transmission formats, including but not limited to T1, T3, E1, E3, OC-1, OC-3, OC-12, ISDN, Ethernet, and SONET. OFDM digital modem 211 is preferably coupled to digital multiplexer 214 to provide multiplexing/demultiplexing of digital signals communicated between IDU subsystem 201 and ODU subsystem 202. Such signals may include subscriber data forward link (transmit) and/or reverse link (receive) as well as various control and overhead signals, such as communication system operation, maintenance, and configuration signals, transmitter control signals, and/or timing signals. Digital multiplexer 214 is preferably coupled to fiber interface 216 which provides arbitration between digital signals transmitted between the different media of the fiber optic cable and electronic circuitry internal to IDU subsystem 201. Accordingly, fiber interface 216 is coupled to fiber optic cable 240 providing communication of digital signals between IDU subsystem 201 and ODU subsystem 202.

The illustrated embodiment of ODU subsystem 202 includes fiber interface 226 providing arbitration between digital signals transmitted between the different media of the fiber optic cable and electronic circuitry internal to ODU subsystem 202. As with fiber interface 216 of IDU subsystem 201, fiber interface 226 of ODU subsystem 202 provides communication of digital signals between ODU subsystem 202 and IDU subsystem 201. Fiber interface 226 is coupled to digital multiplexer 224 to provide multiplexing/demultiplexing of digital signals communicated between ODU subsystem 202 and IDU subsystem 201. Digital multiplexer 224 is preferably coupled to digital to analog and analog to digital circuitry, D/A 222 and A/D 223 respectively, to provide conversion of subscriber data between digital and analog formats, e.g., conversion between digital Internet protocol (IP) and an analog baseband or intermediate frequency. D/A 222 and A/D 223 of the illustrated embodiment are coupled to frequency converter 225 preferably providing frequency conversion between an analog intermediate frequency and an analog RF frequency. Frequency converter 225 is preferably coupled to RF front end 221 which, in turn, is preferably coupled to RF antenna 230 to receive/transmit analog subscriber data associated with wireless communication. Amplifiers may be employed to enhance signal strength in the present system. Preferably such amplifiers are employed in association with converter 225.

It should be appreciated that the above described preferred embodiment isolates processing of analog signals to within the ODU subsystem. Specifically, RF and IF analog signal processing is accomplished in the ODU subsystem and, therefore, only digital signal processing is provided by the IDU subsystem of the preferred embodiment. This configuration provides several advantages. For example, analog signals are often subject to degradation, such as associated with signal attenuation and/or the introduction of noise or interference energy. However, the preferred embodiment illustrated above is configured to convert a received analog signal to digital as quickly as is practicable. Similarly, the preferred embodiment converts a transmitted digital signal to analog at a point very close to the actual wireless communication of the signal to thereby minimize signal degradation associated with analog transmission. Moreover, the integrity of the information carried in a digital signal is easier to verify and/or maintain and, thus, the preferred embodiment provides an architecture in which a high degree of data reliability is maintained.

A further synergistic advantage of the preferred embodiment illustrated above is that consolidation of the analog signal processing within the ODU subsystem allows for better shielding of the analog signals. Specifically, the multiplexing of digital signals may be provided through the use of integrated circuit components requiring little space and dissipating relatively little heat.

Additionally, the digital fiber optic link between the IDU subsystem and ODU subsystem of the illustrated embodiment allows for relatively long distances to be traversed therebetween. Accordingly, an ODU subsystem of this embodiment may be easily deployed upon the roof of a building, and the operator provided with the freedom to dispose the IDU subsystem almost anywhere within the building that is available to him, including the basement of a high-rise tower. This is in addition to the advantages associated with the relatively small diameter and flexibility of the fiber link, which allows its relatively easy deployment in a number of situations, such as through small spaces or openings. Moreover, data transmission through fiber optic links is less susceptible to noise, such as the electromagnetic energy associated with electric motors and transformers, and therefore presents an improved signal path as compared to more traditional copper (e.g., coax) cable solutions. For example, ground loop effect, wherein differences between grounding potential in a rooftop installation and a basement installation, may result in significant electromagnetic interferences penetrating coaxial cables linking such installations. As one skilled in the art will appreciate, such interference is not well tolerated by analog circuits. The use of the preferred optical fiber, digitally linking these installations, negates this interference.

It should be appreciated that the preferred embodiment configuration, providing digital communication between an IDU subsystem and an ODU subsystem, is not itself without challenges. For example, the above described preferred embodiment configuration, wherein only digital signal processing is provided for in the IDU subsystem and all analog signal processing is preferably provided for in the ODU subsystem, results in the separation of circuitry requiring a well controlled timing relationship transparently therebetween. Therefore, although the preferred embodiment ODU subsystem is substantially only burdened with performing RF related duties, control and/or timing challenges are presented with respect to the ODU to IDU interface.

Preferred embodiments of the present invention utilize synchronous communication between IDU subsystem 201 and ODU subsystem 202 to synchronize digital communication within fiber link 240 and operation of ODU subsystem 202. For example, a portion of the digital data stream provided between IDU subsystem 201 and ODU subsystem 202 preferably includes control data of the present invention, such as synchronizing data in the form of timing bits, training sequences, and/or the like. For example, such timing and training may be carried out by timing circuitry generally illustrated by blocks 251 and 252 of FIG. 2.

The present invention may utilize various forms of synchronous protocols in communications between IDU subsystem 201 and ODU subsystem 202 specifically tailored for addressing particular system attributes. For example, in a preferred embodiment wherein multiple ODU subsystems are provided data communication via fiber optic cable 240, a multiplexed synchronous protocol, such as SONET, may be utilized to both address timing issues as well as to provide communication of data between a number of subsystems.

Directing attention to FIG. 3, an embodiment of the present invention leveraging the relatively high data capacity of the fiber optic link between an IDU subsystem and an ODU subsystem of the present invention is shown. Specifically, wireless communication system 300 is configured to couple a plurality of ODU subsystems, ODU subsystems 202 and 302, to an IDU subsystem, IDU subsystem 301, via fiber optic cable 240. Accordingly, wireless communication system 300 may be utilized to serve a relatively large service area and/or a larger number of subscribers than the configuration of FIG. 2 by properly orienting ODU subsystems to illuminate (communicate with) desired areas/subscribers. It should be appreciated that the multiple ODU subsystems of the illustrated embodiment, which may number more than the two represented in FIG. 3, all utilize data communication via fiber optic cable 240, thereby allowing their deployment with little or no cabling burden beyond that for deployment of a single ODU subsystem. Moreover, the aforementioned benefits associated with the use of fiber optic cable continue to be realized.

According to one embodiment as illustrated in FIG. 3, the plurality of ODU subsystems are interconnected in "daisy chain" fashion. For example, ODU subsystem 302 is coupled directly to IDU subsystem 301 via fiber optic cable 240 at fiber interface 326, while ODU subsystem 202 is coupled to ODU subsystem 302 via fiber optic cable 341 at fiber interface 226, thereby providing an indirect connection to IDU subsystem 301 via fiber optic cable 240. Accordingly, fiber interface 326, and perhaps fiber interface 226, may be provided with multiport data routing and/or switching functionality. For example, in a embodiment utilizing the above mentioned SONET protocol in data communications between an IDU subsystem and ODU subsystems, fiber interface 326 may be provided with add/drop multiplexer (ADM) functionality.

It should be appreciated that in providing the embodiment of FIG. 3, IDU subsystem 301 and ODU subsystems 202 and 302 may be configured substantially as described with respect to the embodiment of FIG. 2. For example, ODU subsystems 202 and 302 may include substantially the same components and function substantially as described above with respect to ODU subsystem 202, except that the aforementioned multiport data routing and/or switching functionality may be added. Of course, ODU subsystem 202 of FIG. 2 may include such multiport data routing and/or switching functionality, although perhaps not utilized in that particular configuration, if desired. Accordingly, a single ODU subsystem configuration may preferably be used which allows for increased manufacturing and handling efficiencies and provides for expansion of deployments by adding ODU subsystems and activating multiport data routing and/or switching functionality. Additionally or alternatively, ODU subsystems without multiport data routing and/or switching functionality may be utilized in multipoint hub configurations similar to that of FIG. 3. This may be carried out by disposing a router or switch in fiber optic cable 240 for coupling a plurality of ODU subsystems.

The illustrated embodiment of FIG. 3 includes IDU subsystem 301 adapted to include scaling with respect to the circuitry described above with respect to IDU subsystem 201. Accordingly, IDU subsystem 301 of the illustrated embodiment includes repetition of circuitry described above with respect to IDU subsystem 201 with fiber interface 316 providing combining and separation of the data for communication via fiber optic cable 240. Such circuitry may be included to provide parallel processing of the data associated with multiple subscriber units, to serve multiple isolated networks, to accommodate multiple network interfaces, etcetera. Of course, other configurations of an IDU subsystem may be adopted according to the present invention. For example, the circuitry of IDU subsystem 201 of FIG. 2 may be sufficient to process the data of multiple ODU subsystems coupled thereto, according to an embodiment of the present invention.

Also shown in FIG. 3 is optional fiber optic cable 340 coupling IDU subsystem 301 and ODU subsystem 202. For example, fiber interfaces 226 and 316 may be adapted to include multiport data routing and/or switching functionality to provide a resilient packet ring topology or the like. Such a topology provides redundancy in the data link suitable for tolerating a single point of failure at any point in the ring. Additionally or alternatively, such additional links between the IDU subsystem and ODU subsystems may be utilized to increase the data capacity therebetween.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication method comprising:
providing a first outdoor unit comprising a first wireless interface and a first broadband digital interface to communicate subscriber data, wherein the first outdoor unit performs analog signal processing associated with a wireless communication system;
providing a second outdoor unit comprising a second wireless interface and a second broadband digital interface to communicate subscriber data, wherein the second outdoor unit performs analog signal processing associated with the wireless communication system;
configuring the first and second outdoor units to communicate received signals to an indoor unit over a first and second broadband digital link for digital signal processing; and
where the first outdoor unit is adapted to transmit and receive digital subscriber data between said first broadband digital interface of the first outdoor unit and a first interface of the indoor unit and the second outdoor unit is adapted to transmit and receive digital subscriber data between said second broadband digital interface of the second outdoor unit and the first interface of the indoor unit.

2. The wireless communication method of claim 1 wherein the first and second broadband digital link is a fiber optic cable.

3. The wireless communication method of claim 1 further comprising:
synchronizing the digital communication between the indoor unit and the first outdoor unit using a timing circuitry, wherein a portion of the digital communication includes control data.

4. The wireless communication method of claim 1 further comprising:
providing a third digital interface for the first outdoor unit which is configured to be coupled to a second interface of the indoor unit over a third digital link.

5. The wireless communication method of claim 4 wherein the second broadband digital interface comprises multi-port data routing functionality.

6. The wireless communication method of claim 4 wherein the second broadband digital interface comprises multi-port switching functionality.

7. The wireless communication method of claim 1 further comprising:
coupling a frequency converter to the wireless interface of the first outdoor unit to convert carrier frequency between an intermediate frequency and a radio frequency;
coupling a digital to analog circuitry to the frequency converter and a digital multiplexer;
coupling an analog to digital circuitry to the frequency converter and the digital multiplexer; and
coupling the first digital interface to the digital multiplexer.

8. The wireless communication method of claim 1 further comprising:
providing the indoor unit;
coupling an OFDM digital modem to a digital communication backbone interface of the indoor unit;
coupling a digital multiplexer to the OFDM digital modem; and
coupling the second digital interface to the digital multiplexer.

9. A wireless communication system, said system comprising:
an outdoor unit performing analog signal processing associated with said wireless communication system comprising:
a wireless interface for receiving wireless subscriber data;
logic for converting said received wireless subscriber data to digital subscriber data; and
a first broadband digital interface for transmitting said digital subscriber data to an indoor unit for digital signal processing;
wherein said outdoor unit is adapted to transmit and receive digital subscriber data between said indoor unit on a broadband digital link and is adapted to receive Ethernet data and digital control and timing data; and a second outdoor unit performing analog signal processing associated with said wireless communication system comprising:
  a second wireless interface for receiving wireless said subscriber data;
  logic for converting said received wireless subscriber data to digital subscriber data; and
  a second broadband digital interface for transmitting said digital subscriber data to said indoor unit.

* * * * *